US009821801B2

United States Patent
Di Cairano et al.

(10) Patent No.: US 9,821,801 B2
(45) Date of Patent: Nov. 21, 2017

(54) SYSTEM AND METHOD FOR CONTROLLING SEMI-AUTONOMOUS VEHICLES

(71) Applicant: Mitsubishi Electric Research Laboratories, Inc., Cambridge, MA (US)

(72) Inventors: Stefano Di Cairano, Somerville, MA (US); Xiaodong Lan, Allston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 10 days.

(21) Appl. No.: 14/753,162

(22) Filed: Jun. 29, 2015

(65) Prior Publication Data

US 2016/0375901 A1 Dec. 29, 2016

(51) Int. Cl.
*G01C 21/34* (2006.01)
*B60W 30/09* (2012.01)
*B60W 50/00* (2006.01)
*B60W 50/08* (2012.01)
*B60W 30/10* (2006.01)

(52) U.S. Cl.
CPC ............ *B60W 30/09* (2013.01); *B60W 30/10* (2013.01); *B60W 50/0097* (2013.01); *B60W 50/087* (2013.01); *G01C 21/34* (2013.01); *G01C 21/3453* (2013.01); *B60W 2550/10* (2013.01)

(58) Field of Classification Search
CPC ...... G05D 1/0212; B60W 30/09; G01C 21/34
USPC .......................................... 701/26, 411, 416
See application file for complete search history.

(56) References Cited

U.S. PATENT DOCUMENTS

| 7,734,387 | B1 | 6/2010 | Young et al. |
| 8,038,062 | B2 | 10/2011 | Kenefic |
| 8,666,548 | B2 | 3/2014 | Lim |
| 9,229,453 | B1 * | 1/2016 | Lee ...................... G05D 1/0214 |
| 2010/0228427 | A1 | 9/2010 | Anderson et al. |
| 2014/0207325 | A1 | 7/2014 | Mudalige et al. |

OTHER PUBLICATIONS

Gray et al., Predictive Control for Agile Semi-Autonomous Ground Vehicles Using Motion Primitives, Jun. 2012, Proc. American Control Conference 2012.*
Jeon et al., Anytime Computation of Time-Optimal Off-Road Vehicle Maneuvers Using the RRT, Dec. 2011, 50th IEEE Conf. on Decision and Control and European Control Conference.*
Yang et al., An Analytical Continuous-Curvature Path-Smoothing Algorithm, Jun. 2010, IEEE Transactions on Robotics, vol. 26, No. 3.*

\* cited by examiner

*Primary Examiner* — Mussa A Shaawat
*Assistant Examiner* — Nadeem Odeh
(74) *Attorney, Agent, or Firm* — Gene Vinokur; James McAleenan; Hironori Tsukamoto

(57) ABSTRACT

A method for controlling a semi-autonomous vehicle modifies a current path for the vehicle desired by a driver of the vehicle. The current path starts at a current position of the vehicle and ends in a target position of the vehicle and the method modifies the current path while preserving the current position and the target position of the vehicle in the modified path. The method overrides the actions of the driver to control a movement of the vehicle according to the modified path.

15 Claims, 11 Drawing Sheets

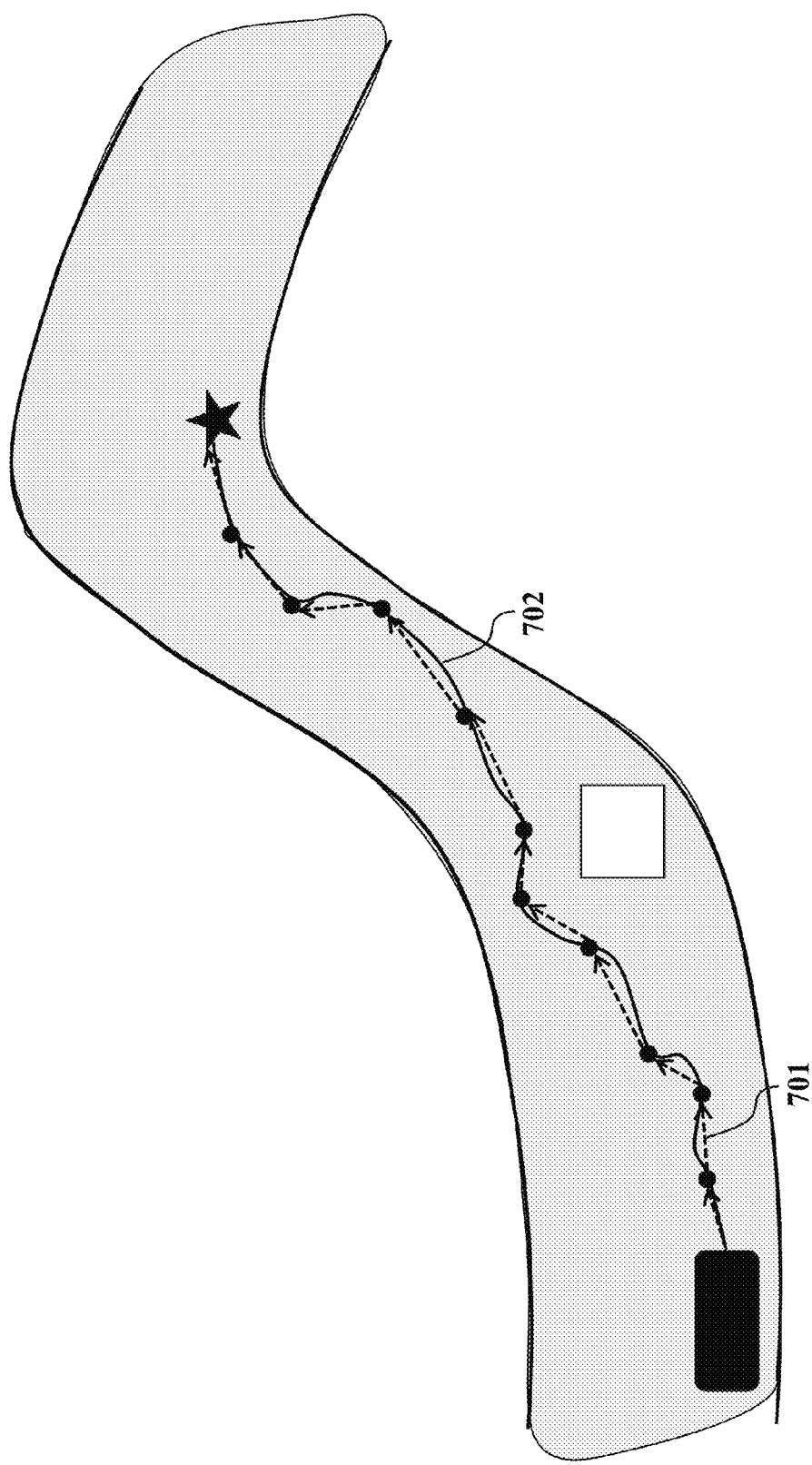

SYSTEM AND METHOD FOR CONTROLLING SEMI-AUTONOMOUS VEHICLES

FIELD OF THE INVENTION

The present invention relates generally to controlling vehicles, and more particularly to controlling semi-autonomous vehicles.

BACKGROUND OF THE INVENTION

Some control systems used by autonomous or semi-autonomous vehicles aim to avoid accidents of the vehicles by predicting safe path for the vehicle through the surrounding sensed by various sensors of the vehicles. Sensory information can include data related to nearby vehicles, pedestrians, road edges, and other salient features to assess accident threat. Such control systems ideally operate only during instances of significant threat, i.e., the control system allows the driver of the vehicle to have full control of the vehicle in low threat situations, but override the driver actions to control the movement of the vehicle during high threat situations. See, e.g., a method described in U.S. 2010/0228427. During those high threat situations, the control of the vehicles is similar to the control of the autonomously driven vehicles.

A path planning suitable for autonomous driving has been considered by a number of different systems and/or methods. For example, a method of U.S. 2014/0207325 describes a path generation from a pre-assigned grid on the road to possibly a lane change or passing maneuver. In U.S. Pat. No. 8,038,062B2 the grid is not fixed and expanded during the algorithm execution, which however requires the solution of complex numerical problems to account for kinematic constraints. To avoid these problems, the method of U.S. Pat. No. 7,734,387 uses a grid search followed by a smoothing algorithm to account for kinematic constraints. The construction of the grid of points in the path planning algorithm is often very complex, and hence in U.S. Pat. No. 8,666,548B2 a randomized algorithm is proposed, which operates in the vehicle configuration space to obtain a path that is close to what the vehicle can execute, but not smooth, that is, the path has sharp corners that the vehicle cannot exactly execute.

All those methods ignore the previous actions of the driver. However, in semi-autonomous vehicles, the driver regains the control of the vehicles after the threat is reduced and needs to further control the vehicle according to the objectives indicated by currently ignored previous actions.

SUMMARY OF THE INVENTION

Some embodiments of the invention are based on realization that the path modified by the control system of the semi-autonomous vehicles needs to remain close to the current path desired by the driver as much as possible. In such a case, when the driver regains the control, the driver is less disoriented by the overridden actions of the control system and can return quicker to the objective of the driving. To that end, different embodiments of the invention determine the path for the vehicle to avoid an obstacle with consideration of the current path of the vehicle determined in response to actions received from a driver of the vehicle.

For example, one embodiment determines the modified path such that a target position of the vehicle according to the current path remains unchanged. Additionally or alternatively, some embodiments determine the modified path avoiding the obstacle with minimal deviation from the current path. For example, one embodiment determines the modified path by optimizing a cost function of a deviation of the modified path from the current path. Another embodiment, determines the modified path by optimizing a cost function balancing a combination of the deviation from the current path and the difference in curvature of the modified path that avoids the obstacles with respect to the current path.

Some embodiments of the invention are based on recognition that such a computation has to be performed in real time, e.g., in response to detecting an obstacle on the current path of the vehicle. To that end, the computation required for determining the modified path has to be efficient. However, the solutions of the optimization problems required to optimize a cost function subject to constraints on the movement of the vehicles are usually complex.

Therefore, some embodiments provide different stages for computation of the modified path. The first stage is coarse and includes optimization of the coarse paths formed by different sequences of randomly sampled points with coarse separation connecting the current and the target position. The optimization of the coarse paths reduces the computational complexity. The next stage involves refining by optimization of the fine paths formed by different sequences of randomly sampled points with fine separation and close to the coarse path. A subsequent stage involves removing redundant points in the fine path to obtain a pruned path. A final stage involves smoothing the pruned path. In such a manner, the total computational complexity of the method for determining the modified path is reduced.

In addition, some embodiments determine the coarse paths backwards, i.e., from the target position to the current position. However, when the current position of the vehicle changes, the embodiment updates the selected coarse path forwards while preserving a portion of the modified path approaching the target position. In such a manner, a portion of the selected path can be reused, which further reduce the computational complexity.

Accordingly, one embodiment discloses a method for controlling a semi-autonomous vehicle. The method includes determining a current path for the vehicle in response to actions received from a driver of the vehicle, wherein the current path starts at a current position of the vehicle and ends in a target position of the vehicle; modifying the current path for the vehicle while preserving the current position and the target position of the vehicle in a modified path; and overriding the actions of the driver to control a movement of the vehicle according to the modified path, wherein steps of the vehicle are performed using a processor of the vehicle.

Another embodiment discloses a method for controlling a semi-autonomous vehicle. The method includes determining a current path for the vehicle in response to actions received from a driver of the vehicle; modifying the current path for the vehicle, in response to detecting an obstacle on the current path of the vehicle, to produce a modified path avoiding the obstacle, wherein the modifying includes optimizing a cost function of a deviation of the modified path from the current path; and overriding the actions of the driver to control a movement of the vehicle according to the modified path, wherein steps of the vehicle are performed using a processor of the vehicle.

Yet another embodiment discloses a semi-autonomous vehicle including a navigation system for determining a current path for the vehicle in response to actions received from a driver of the vehicle, wherein the current path starts at a current position of the vehicle and ends in a target position of the vehicle; a sensor for detecting an obstacle on the current path of the vehicle; a path planning system for modifying the current path for the vehicle, in response to detecting an obstacle on the current path of the vehicle, to produce a modified path avoiding the obstacle, wherein the modifying includes optimizing a cost function of a deviation of the modified path from the current path, wherein the cost function is optimized subject to constraints on the movement of the vehicle, and wherein the constraints includes a constraint enforcing the modified path to start at the current position of the vehicle and to end at the target position of the vehicle; and a set of actuators for overriding the actions of the driver to control a movement of the vehicle according to the modified path.

BRIEF DESCRIPTION OF THE FIGURES

FIG. 7 is a schematic illustrating smoothing of the pruned path according to one embodiment of the invention;

DETAILED DESCRIPTION OF THE PREFERRED EMBODIMENTS

Figure 1A:
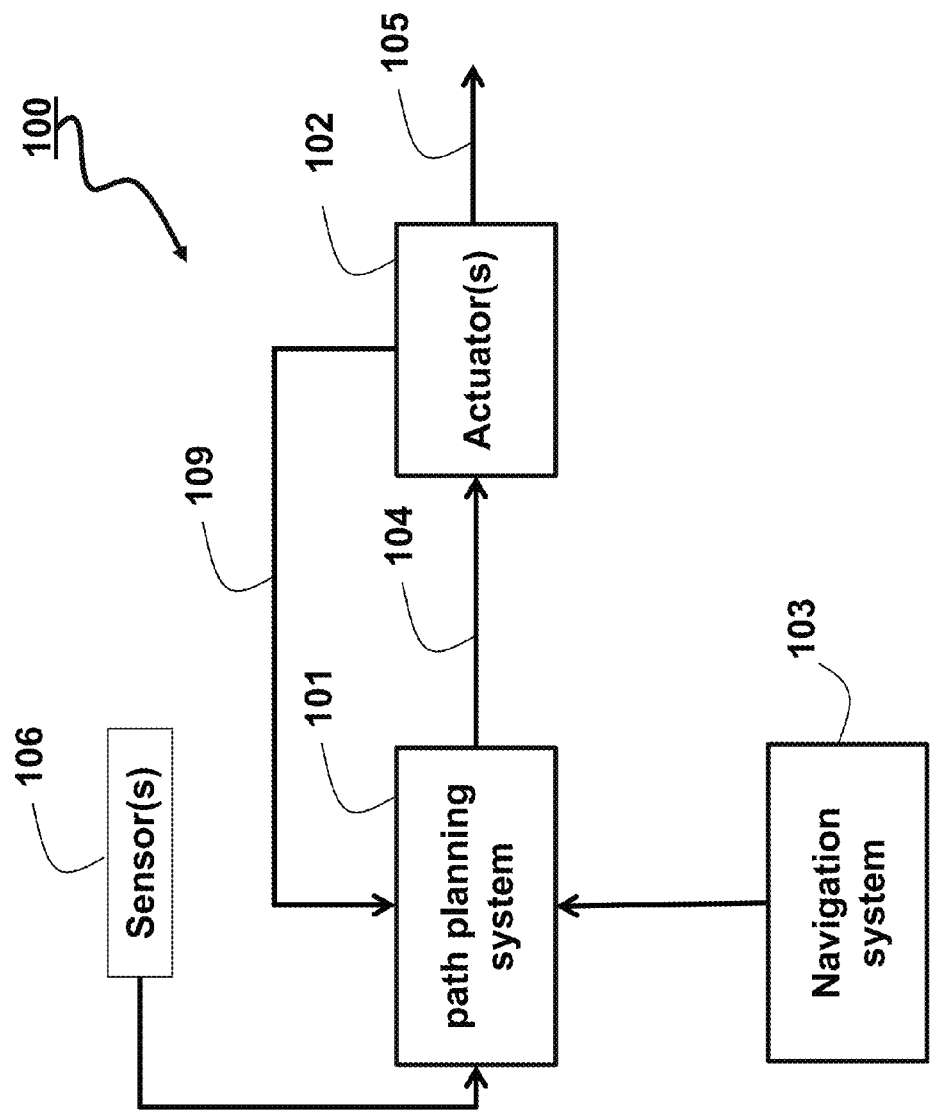
FIG. 1A is a block diagram of a semi-autonomous vehicle according to some embodiments of the invention.

FIG. 1A shows a block diagram of a semi-autonomous vehicle 100 according to some embodiments of the invention. The vehicle 100 can be any type of moving vehicle that includes an autonomous system able to override the action of the driver of the vehicle and to take over the control of the vehicle from the driver when certain conditions arise. For example, the vehicle 100 can be a four wheeled passenger car.

The vehicle 100 includes a navigation system 103 for determining a current path for the vehicle in response to actions received from a driver of the vehicle, such as the operation of the steering wheel and pedals. For example, the current path starts at a current position of the vehicle and ends in a target position of the vehicle. The vehicle 100 includes at least one sensor 106 for detecting an obstacle on the current path of the vehicle and a set of actuators 102 for overriding the actions of the driver to control a movement of the vehicle to avoid the obstacle according to a modified path different than the current path determined by the navigation system. An obstacle can be an actual obstacle, such as another vehicle or a pedestrian, or a virtual obstacle representing illegal driving behavior, such as the line delimiting the allowed driving lane, or a stop line.

The vehicle 100 also includes a path planning system 101 for modifying the current path for the vehicle, in response to detecting an obstacle on the current path of the vehicle, to produce a modified path avoiding the obstacle. In one embodiment, the path planning system optimizes a cost function of a deviation of the modified path from the current path. In such a manner, the path planning system considers the current path indicated by the previous actions of the driver, such as the operation of the steering wheel and pedals, for determining the modified path avoiding the obstacle. As a result, when the driver regains the control of the vehicles after the obstacle posing the threat is avoided, the driver can more easily control the vehicle further according to the objectives indicated by the previous actions of the driver.

For example, one embodiment modifies the current path for the vehicle while preserving the current position and the target position of the vehicle in the modified path. In some implementations using the cost function to determine the modified path, the cost function is optimized subject to constraints on the movement of the vehicle including a constraint enforcing the modified path to start at the current position of the vehicle and to end at the target position of the vehicle.

The path planning system receives the current path including the current position, the target position and the surrounding environment map containing drivable and non-drivable areas, such as obstacles and off-road, for the vehicle, and provides a modified path 104 for the vehicle that reaches the goal avoiding the non-drivable areas. The path can include one or combination of positions, orientations, and translational and rotational velocities of the vehicle. The path is used by the vehicle control system to actuate vehicle commands, such as steering, brakes, throttle, that affect the vehicle motion resulting in the generation of vehicle motion 105 for the vehicle that matches the provided path.

The path planning system 101 receives information 109 about the vehicle motion, from sensors, hardware, or software connected directly or remotely to the machine. The information 109 includes a state of the vehicle. The path planning system also receives the information about the environment from sensors 106, which is represented in the form of a map. The path planning system 101 uses the vehicle and the environment information for the selection of the vehicle path 104 which determine the movement of the vehicle 105.

Figure 1B:
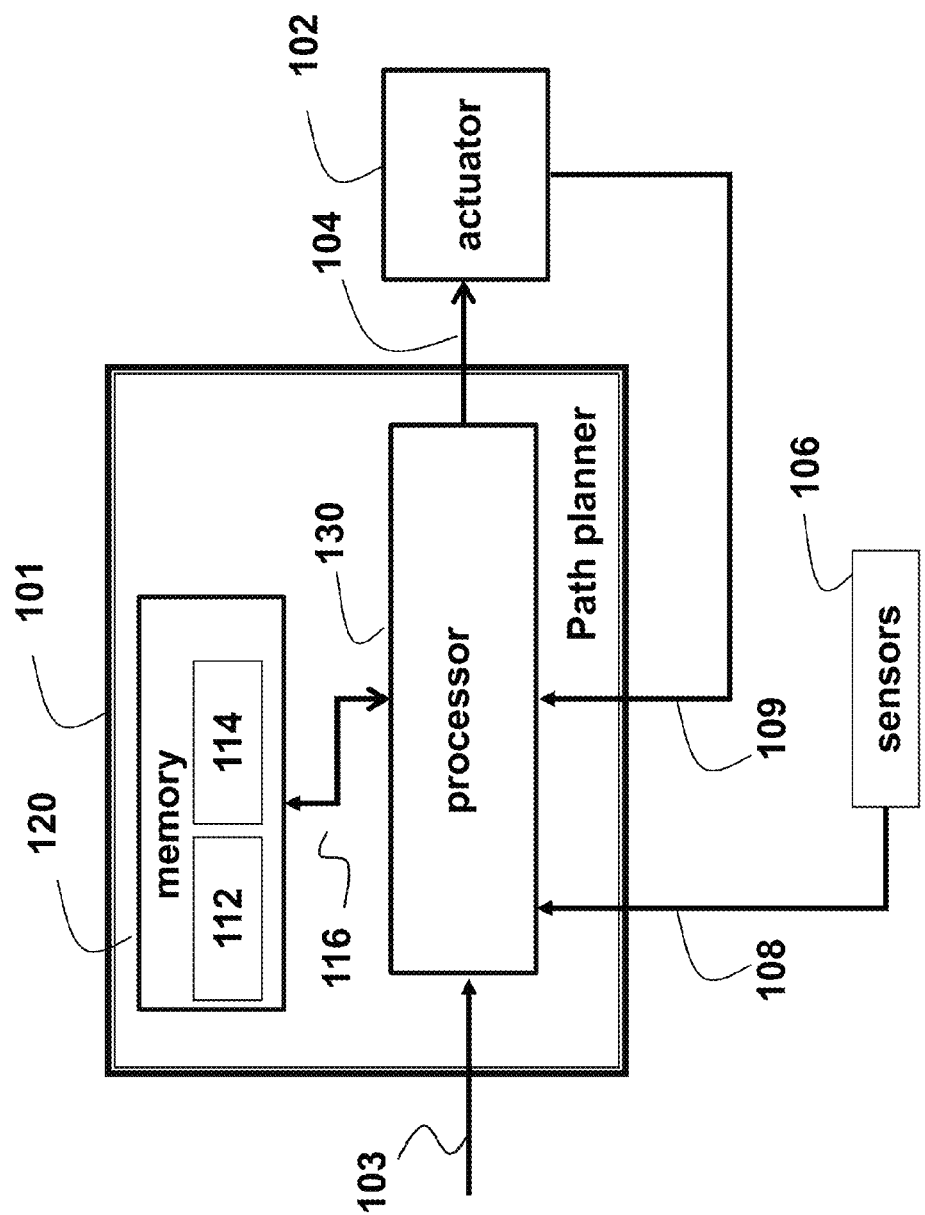
FIG. 1B is a block diagram of a path planning system according to one embodiment of the invention.

FIG. 1B shows a general structure of the path planner 101 according to one embodiment of the invention. The path planning system 101 includes at least one processor 130 for executing modules of the path planning system. The processor 130 is operatively connected to a memory 120 for storing the map 112 of the environment and the vehicle information 114. In some implementations, the memory 120 is shared with the navigation system 103. It is an objective of some embodiments of the invention to determine the path 104 using an adjustable cost function, and a model of the machine subject to the constraints. In some embodiments, the information on the vehicle and the environment are updated 116 based on information received from the vehicle 109 and the sensing 108.

Some embodiments of the invention are based on realization that the path modified by the control system of the semi-autonomous vehicle needs to remain close to the current path desired by the driver as much as possible. In such a case, when the driver regains the control, the driver is less disoriented by the overridden actions of the control system and can return quicker to the objective of the driving. To that end, different embodiments of the invention determine the path for the vehicle to avoid an obstacle with consideration of the current path of the vehicle determined in response to actions received from a driver of the vehicle.

Figure 2:
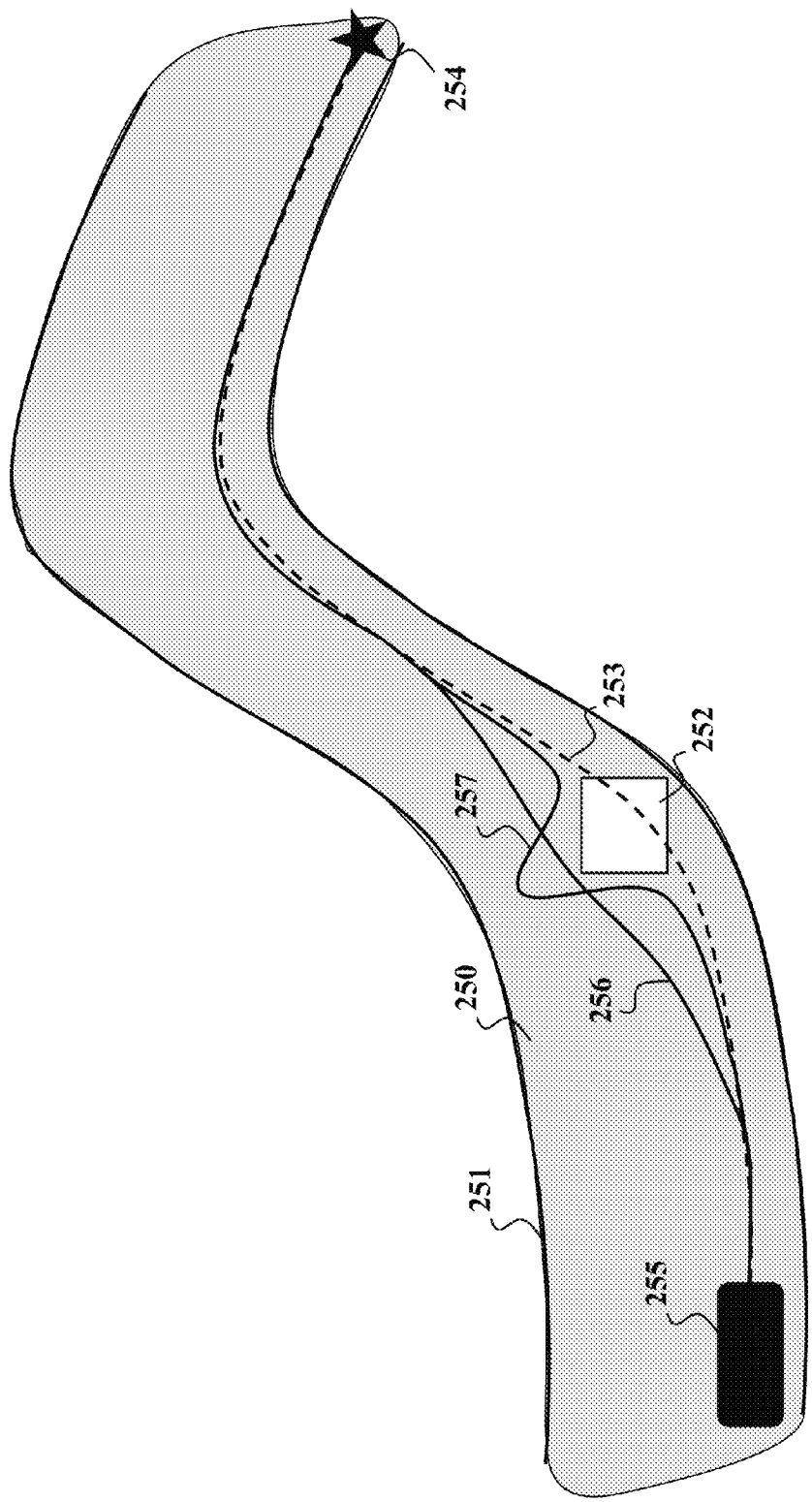
FIG. 2 is a schematic of different modified paths determined according to some principles employed by various embodiments of the invention.

FIG. 2 shows a schematic of different modified paths determined according to some principles employed by various embodiments of the invention. The drivable area 250 includes the road 251 except for the area 252 where an obstacle is present. The driver desired path, i.e., the current path 253, can be interpreted as the reference path the reaches the target position 254 from the current position 255 of the vehicle, but goes through the non-drivable area of the obstruction 252. Thus, the path planner generates the modified path, such as paths 256 and 257 that avoid the obstacle 252 but starts and end at the same positions as the current path 253.

In different embodiments, the modified path is determined by optimizing a cost function balancing a combination of a deviation of the modified path from the current path and other metric of performance, such as a curvature of the modified path to avoid the obstacle and a difference in curvature between current path and modified path. In vehicles equipped with steer-by-wire systems, keeping a small difference of curvature between current path and modified path may allow the execution of the modified path by steering the vehicle wheels without changing the steering wheel and eventually re-aligning the steering wheel with the vehicle wheels in a way that does not disorient the driver. For example, the modified path 257 minimizes the total position difference from the current path, but generates large curvature difference around the obstruction 252. Conversely, the modified path 256 has larger total position difference from the current path, but has less difference in curvature from the current path 252. The cost function formulation determines which of the two paths is selected as final modified path.

Figure 3:
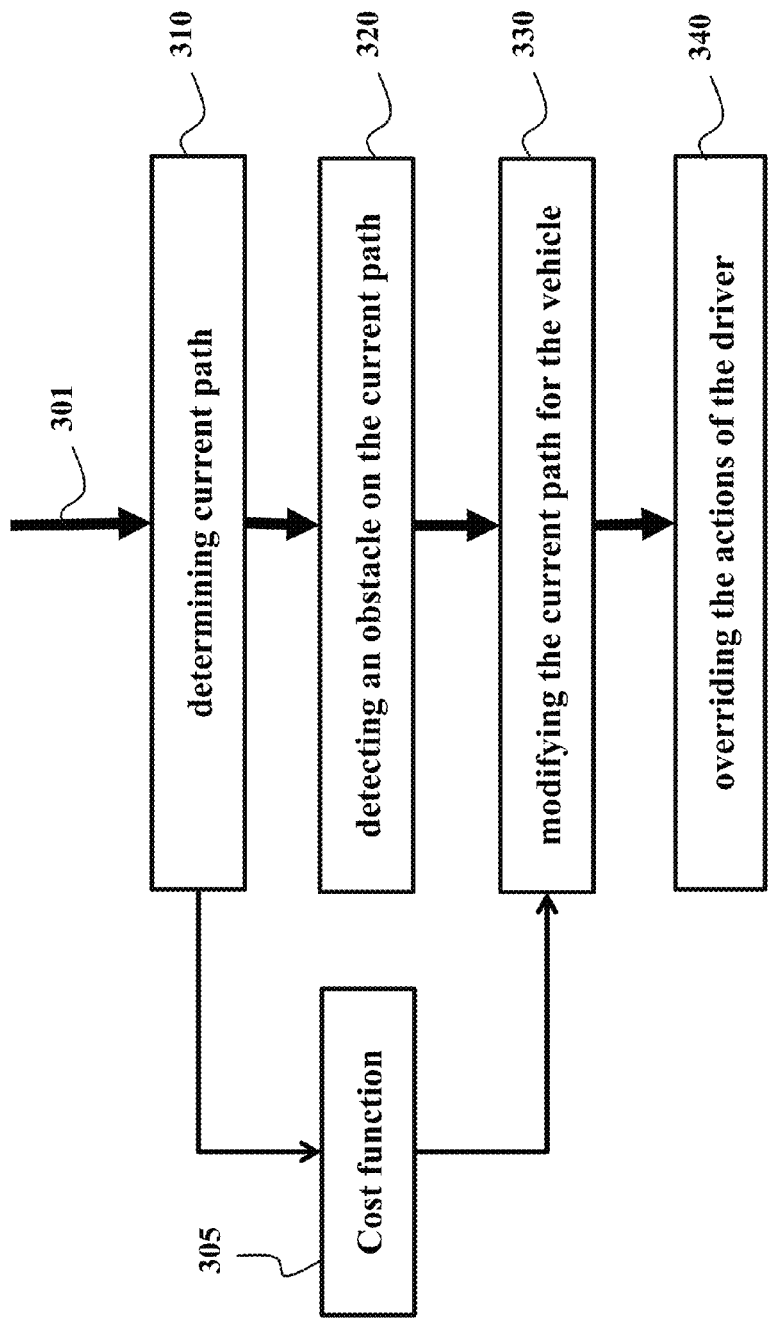
FIG. 3 is a flow chart of a method for controlling a semi-autonomous vehicle by considering a path desired by a driver according to some embodiments of the invention.

FIG. 3 shows a flow chart of a method for controlling a semi-autonomous vehicle by considering the current path desired by the driver according to some embodiments of the invention. The method determines 310 a current path for the vehicle in response to actions 301 received from a driver of the vehicle. When an obstacle on the current path is detected 320, the method modifies 330 the current path for the vehicle to produce a modified path avoiding the obstacle. In this method, the modifying includes optimizing a cost function 305 of the current path. In such a manner, the modified path is generated in consideration of the current path desired by the driver.

For example, in one embodiment, the cost function is a function of a deviation of the modified path from the current path. Additionally or alternatively, the cost function can be a function of a difference of the curvature of the modified path and the current path, or any other metric of performance. For example, in one embodiment, the modifying includes optimizing a cost function reducing a deviation of the modified path from the current path. In alternative embodiment, the modifying includes optimizing a cost function balancing a combination of a deviation of the modified path from the current path and a curvature difference of the modified path to avoid the obstacle and the current path.

Some embodiments determine a set of paths from the current position to the target position of the vehicle, such that each path avoid the obstacle while satisfying driving constraints and selects the modified path from the set of paths based on a difference between the current path and the modified path and the metric of performance. After the modified path is determined, the method overrides 340 the actions of the driver to control a movement of the vehicle according to the modified path.

Some embodiments of the invention are based on recognition that such a computation has to be performed in real time, e.g., in response to detecting an obstacle on the current path of the vehicle. To that end, the computation required for determining the modified path has to be efficient. However, the solutions of the optimization problems required to optimize a cost function subject to constraints on the movement of the vehicles are usually complex.

Therefore, some embodiments provide different stages for computation of the modified path. The first state is coarse and includes optimization of the coarse paths formed by different sequences of randomly sampled points with coarse separation connecting the current and the target position. The optimization of the coarse paths reduces the computational complexity. The next stage involves refining by optimization of the fine paths formed by different sequences of randomly sampled points with fine separation and close to the coarse path. A subsequent stage involves removing redundant points in the fine path to obtain a pruned path. A final stage involves smoothing the pruned path. In such a manner, the total computational complexity of the method for determining the modified path is reduced.

Figure 4A:
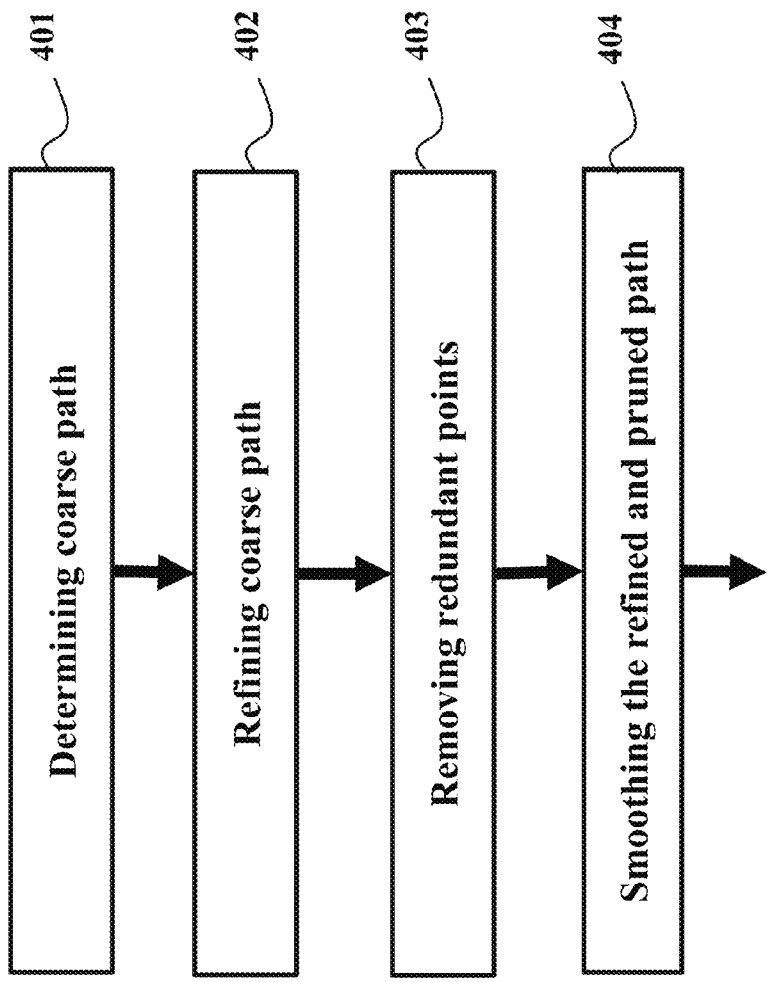
FIG. 4A is a flow chart of a multi-stage method for modifying the path according to some embodiments of the invention.

FIG. 4A shows a flow chart of a multi-stage method for determining the modified path according to some embodiments of the invention. The method determines 401 a coarse path defined by a set of points with coarse separation connecting the current position with the target position. For example, one embodiment determines a set of coarse paths and selects the coarse path from the set of coarse paths by optimizing a cost function of a deviation of each coarse path from the current path subject to constraints on the modified path.

Next, the method refines 402 the coarse path to produce a refined path defined by a set of points with fine separation, i.e., less than the coarse separation, and close to the selected coarse path. For example, the refined path can be generated 402, by exploring only the area around the coarse path, now with high density of sample points. Next, the method removed 403 redundant points of the refined path that increase the value of the cost function without being useful and/or required for avoiding the obstacle and smooths 404 a trajectory connecting the points of the pruned refined path to produce the vehicle drivable path. For example, the redundant points can be removed from the refined path to obtain a path with fewer curves, and the path is smoothed by applying proper curvature functions.

Generation of Coarse Path

Figure 4B:
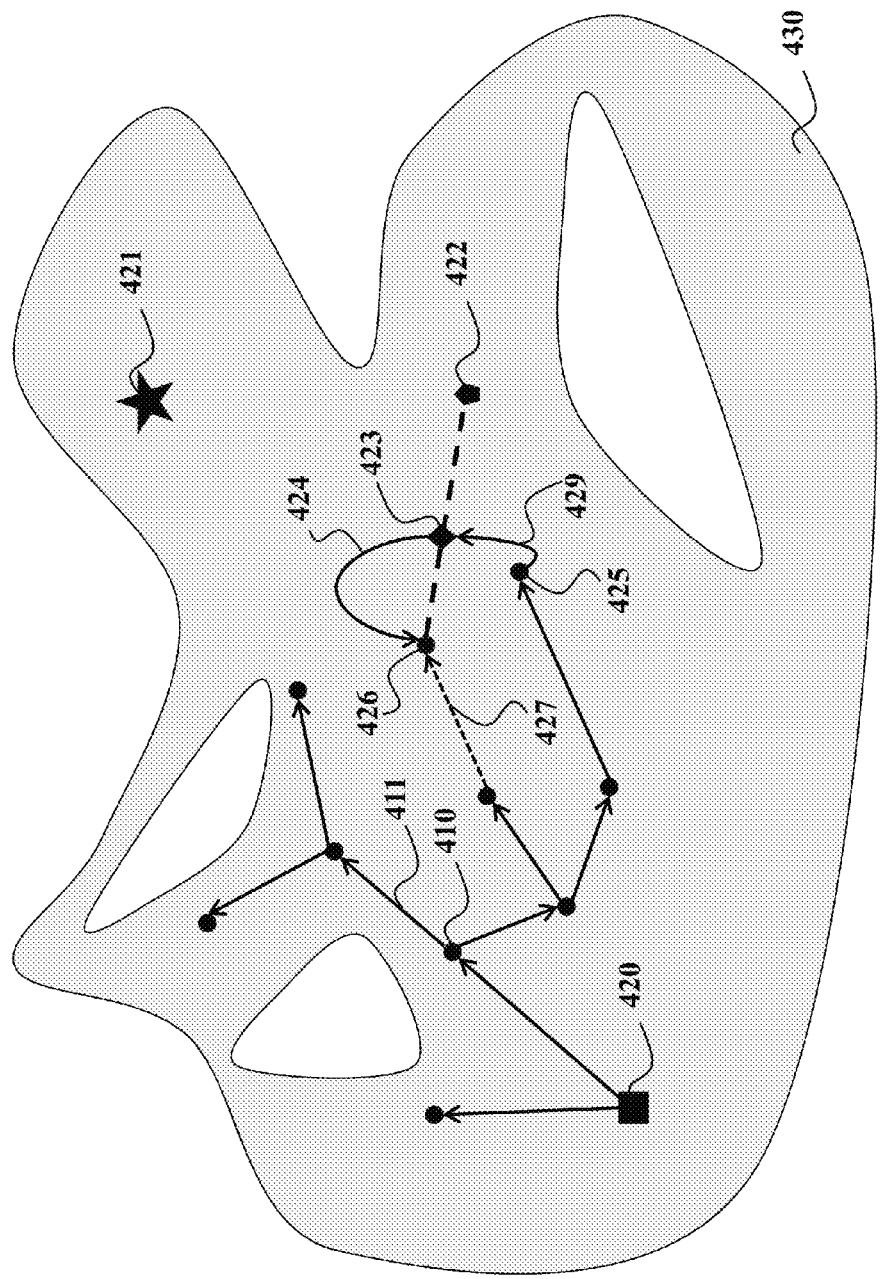
FIG. 4B is a schematic illustrating determining of a coarse path according to one embodiment of the invention.

FIG. 4B shows a schematic illustrating determining 401 of the coarse path according to one embodiment. The embodiment generates points of the coarse path as nodes on a tree and updates the routes forming the set of paths on that tree. The current tree in the drivable space 430 is shown with root node 420 representing the current position of the vehicle and includes nodes such as a node 410 connected by links such as a link 411. The tree can also include a target position 421 that the tree has to eventually reach.

In one embodiment, a new point 422 in the drivable space is randomly selected, and the closest node 426 in the tree according to a distance measure is selected. The new node 423 of the tree is obtained from point 422 and node 426 for instance as the point in the line between 426 and 422 within a given distance from 426. Such distance is large for coarse paths and small for fine paths. The new node 423 is connected to the tree by adding the link 429 from new node 423 to a node 425 on the tree in the neighborhood of new node 422 such that the path connecting the nodes 420 and 423 is more optimal according to the cost function than other possible paths. Next, existing links on the tree are updated. For example, the nodes in a neighborhood of new node 423, are evaluated to determine a better path from the root 420 to the node that goes through the new node 423. For instance for node 426 the older link 427 can be dropped and the new link 424 can be added.

Some embodiments determine the path from the current to the target position for the semi-autonomous driving subject to global and local constraints, where global constraints are expressed in terms of path properties, and local constraints are expressed in terms of node properties. The global constraints are used to avoid the obstacles, which can be static and dynamic. Under normal conditions, the vehicle moves along a current path, e.g., a driver commanded path, and an estimate of this path is known in advance.

Various embodiments use the current path as a reference path. However, such reference path can collide with obstacles, for example, a stopped vehicle, or a pedestrian on the road, or a lane obstacle. In these situations, some embodiments override actions of the driver making the vehicle to maneuver to avoid such obstacles without excessive deviation from the reference path to limit disturbance to the driver. So the path generated by some embodiments starts from the reference path, performs the needed maneuvers and comes back to the reference path.

In some embodiments, the local constraints are related to the kinematic and dynamic behavior of the vehicle. For example, one kinematic constraint is that the curvature $\kappa$ of the maneuver path needs to be close to the reference curvature $\kappa_{ref}$ of the reference path. For the dynamic constraints, some embodiments ensure that the curvature is continuous, because discontinuities in the curvature can cause infinite variations of the lateral acceleration and velocity. To that end, the path determined by the path planning system 101 is at least second order differentiable. Some embodiments search for $G^2$ continuous path, which means that two consecutive segments of the path have the same tangent line and the same center of curvature at their joint point.

One embodiment samples points in the configuration space of the semi-autonomous vehicle. For example, the embodiments samples the position of the vehicle as well as its orientation $(p_{x_{rand}}, p_{y_{rand}}, \psi_{rand})$, where $(p_{x_{rand}}, p_{y_{rand}})$ is sampled from the drivable space and $\psi_{rand}$ is sampled uniformly between $(-\pi, \pi]$. Sampling the orientation helps to achieve major smoothness of the path because the orientation change between two consecutive waypoints can be limited. Also, one embodiment uses the orientation to remove redundant points from the refined path.

In some embodiments, the sampling takes place in two stages. In the first stage, the entire environment is sampled and a coarse path is generated by rapidly exploring the entire environment. The coarse path is an acceptable path between the initial configuration and the goal configuration, but its performance can be improved.

Denote a configuration of the vehicle in a 2D environment by $x:=(p_x, p_y, \psi)$ where $p_x$ and $p_y$ are the x and y coordinates of the vehicle's position, and $\psi$ is the orientation of the vehicle, $\psi \in (-\pi, \pi]$. Use $x=(p,\psi)$ to denote a configuration, where $p=(p_x, p_y)$ is the position of the vehicle in the 2D environment. Denote the initial configuration and goal configuration of the vehicle by $x_{init}$ and $x_{goal}$, respectively. Denote the bounded and connected configuration state space by $X \in R^3$. Denote the obstacle region and the obstacle-free region in the configuration space by $X_{obs}$ and $X_{free}:=X \backslash X_{obs}$, respectively. A feasible path in the configuration space is $\sigma:[0,S] \mapsto X_{free}$, where S is the total length of the path. Denote by $\Sigma_{X_{free}}$ all the feasible paths in $X_{free}$. Denote by $\sigma_{x_1,x_2}$ the path between two states $x_1$ and $x_2$. Denote a reference path in X by $\sigma_{ref}$, where $\sigma_{ref}$ is in X, but not necessarily in $X_{free}$. Let $c:\Sigma_{X_{free}} \mapsto R_{\geq 0}$ be a cost function, which assigns a non-negative cost to all nontrivial collision-free paths. We assume that this cost function is additive. That is, if $x_2$ is a point on the path connecting $x_1$ and $x_3$, then $c(\sigma_{x_1,x_3})=c(\sigma_{x_1,x_2})+c(\sigma_{x_2,x_3})$. Given a tree $T=(V,E)$ rooted at $x_{root}$, for any node $v \in V$ inside the tree, Cost(v) is the optimal cost of the path from the root of the tree to v, that is, $\text{Cost}(v):=c^*_{x_{root},v}$.

Some embodiments modified the current path by solving the following problem. Given a bounded and connected configuration space X, an obstacle region $X_{obs}$, an initial state $x_{init} \in X_{free}$, a goal state $x_{goal} \in X_{free}$ and a twice continuously differentiable reference path $\sigma_{ref}$, find a $G^2$ continuous path $\sigma^*:[0,S] \mapsto X_{free}$ such that (i) $\sigma^*(0)=x_{init}$ and $\sigma^*(S)=x_{goal}$, and (ii)

$$c(\sigma^*) = \min_{\sigma \in \Sigma_{X_{free}}} c(\sigma),$$

where $c(\sigma)$ is a cost function which penalizes the difference of curvatures between the reference path $\sigma_{ref}$ and $\sigma$. If no such path exists, one embodiment reports a failure.

Some embodiments define a function SampleFree: $Z_{>0} \mapsto X_{free}$, where $X_{free}$ is the drivable space, returns independent identically distributed (i.i.d.) samples from the drivable space 430. In FIG. 4B, the function SampleFree returns point 422. Given a tree $T=(V,E)$ where V is a set of nodes and E is a set of edges, or links, each joining two nodes, and a point $x \in X_{free}$, a function Nearest: $(T,x) \mapsto v$ returns a node $v \in V$ which is closest to x in terms of a cost function, that is, $\text{Nearest}(T,x):=\text{argmin}_{v \in V} c^*_{v,x}$. In FIG. 4B, the function Nearest returns a point 426.

Given two points $x_1, x_2 \in X_{free}$, a positive real number $\eta \in R_{>0}$, the function Steer: $(x_1, x_2, \eta) \mapsto x_3$ returns $x_3 \in X_{free}$ such that $x_3$ is a point on the optimal path connecting $x_1$ and $x_2$. In this paper, we choose $x_3$ as $\text{Steer}(x_1, x_2, \eta):=\{x_3=(p_3, \psi_3) \in \sigma^*_{x_1,x_2} \| p_3-p_1 \| \leq \eta, \psi_3=\psi_2\}$, where $\|\cdot\|$ is the Euclidean norm, and $\eta$ is the allowed distance. In FIG. 4B, the function Steer returns a point 423.

Given a tree $T=(V,E)$, a state $x=(p,\psi) \in X_{free}$ and a positive real number $r \in R_{>0}$, the function Near:$(T,x,r) \mapsto V' \subseteq V$ returns the nodes in V that are in the neighborhood of x. That is, $\text{Near}(T,x,r)=\{v=(p_v, \psi_v) \in V, \|p_v-p\| \leq r\}$. We choose r as a function of the number of nodes in the tree: $r(|V|)=\min\{\gamma (\log|V|/|V|)^{1/2}, \eta\}$, where $\gamma > \gamma^* = (2(1+1/d)^{1/d} \mu(X_{free})/\zeta_d)^{1/d}$, $\mu(X_{free})$ is the volume of the free space, $\zeta_d$ is the volume of the unit ball in $R^d$, and $|V|$ denotes the number of nodes in V. In FIG. 4B, the function Near returns points 425, 426.

Given two states $x_1, x_2 \in X_{free}$, the Boolean function CollisionFree($x_1, x_2$) returns True if the optimal path $\sigma^*_{x_1, x_2}$ between $x_1$ and $x_2$ lies in the drivable space $X_{free}$ 430 and False otherwise.

One embodiment determines the tree of nodes as follows. The embodiment is initialized by setting as only node the root of the tree $V=x_{root}$ and no edges, $E=\emptyset$. Then, a random point 422 is sampled in the drivable space, the nearest node 426 in the tree is found, and a new random node 423 is returned by steering the nearest node in the tree to the new node, which is in the line between the nearest node and the random point. Collisions along the line connecting the new node and the nearest node are checked and, if no collisions are found, the new node is added to the tree. The new node is connected to the existing tree node that gives minimum value of the sum of the cost to reach the existing tree node from the root node and the cost of reaching the new node from the existing tree node. The cost of reaching the new node is set as the cost of reaching the existing node from the root node, plus the cost of reaching the new node from the existing node.

If the new node is added to the tree, then the nodes 425, 426 near the new node are evaluated to check if those nodes can be reached with paths with lowest cost by passing through the new node. To that end, the embodiment determines the cost to reach the new node and add the cost of reaching any near node from the new node. If such cost is smaller than that currently associated with the node, a link is added from the new node to the node, and the older link reaching the new node is removed.

Cost Function

Given two states $x_1=(p_1, \psi_1)$ and $x_2=(p_2, \psi_2)$, where $p_1=(p_{x_1}, p_{y_1})$ and $p_2=(p_{x_2}, p_{y_2})$, one embodiment selects the cost function as $$c(\sigma_{x_1,x_2}) = w_1 \mu \|p_1 - p_2\| + w_2(\theta_1 + \theta_2) + w_3(\kappa(x_1) - \kappa_{ref}(x_1, \sigma_{ref}))^2, \quad (1)$$

where $w_1$ is the weight on the Euclidean distance, $w_2$ is the weight on the smoothness of the path, and $w_3$ is the weight on the difference between the curvature of the planned path and the reference path, $\theta_1$ is the angle between $\psi_1$ and the vector $\overline{p_1 p_2}$. Specifically, $$\theta_1 = \frac{u_1 \cdot \overline{p_1 p_2}}{\|\overline{p_1 p_2}\|}, u_1 = [\cos(\psi_1), \sin(\psi_1)]^T.$$

Similarly, $\theta_2$ is the angle between $\psi_2$ and the vector $\overline{p_1 p_2}$, $\theta_1, \theta_2 \in [0, \pi]$, $\kappa(x_1)$ is the curvature at node $x_1$ and $\kappa_{ref}(x_1, \sigma_{ref})$ is the corresponding reference curvature at $x_1$. Next, we show how to calculate $\kappa(x_1)$ and $\kappa_{ref}(x_1, \sigma_{ref})$ given $x_1, x_2$ and $\sigma_{ref}$.

The curvature of the planned path in the cost function (1) can be computed in multiple ways. For instance, if the smoothing procedures uses $G^2$ Continuous Cubic Bézier Spiral (G2CBS) to connect two edges, the maximum curvature of the G2CBS curve as the curvature at the joining nodes of the two edges can be used. When the parent of node $x_1$ is $x_{parent}=(p_{parent}, \psi_{parent})$, the magnitude of the curvature at $x_1$ is given by $$|\kappa(x_1)| = \frac{q_4 \sin \beta}{L_{\cos^2 \beta}} \quad (2)$$

where $q_4$ is a parameter satisfying $$q_1 = 7.2364, q_2 = \frac{2}{5}(\sqrt{6} - 1), q_3 = \frac{q_2 + 4}{q_1 + 6}, q_4 = \frac{(q_2 + 4)^2}{54 q_3},$$

$$\beta = \frac{\gamma}{2}$$

and $\gamma$ is the angle between the vector $\overline{p_{parent} p_1}$ and the vector $\overline{p_1 p_2}$, $$\beta \in [0, \frac{\pi}{2}],$$

and L is the distance between $B_0$ and $p_1$. The sign of $\kappa(x_1)$ is determined by the rotation direction of the unit tangent vector at $p_1$ in the 2D plane. Specifically, if $B_0$ is the starting point of the curve and $E_0$ is the end point of the curve, then if the unit tangent vector rotates counterclockwise, $\kappa(x_1) > 0$. Instead, if it rotates clockwise, then $\kappa(x_1) < 0$. The sign of $\kappa(x_1)$ can be determined by considering the direction of the cross product $\overline{p_{parent} p_1} \times \overline{p_1 p_2}$. That is, $$\text{sgn}(\kappa(x_1)) = \begin{cases} 1 & \text{if } (\overline{p_{parent} p_1} \times \overline{p_1 p_2}) \cdot \vec{e} > 0 \\ 0 & \text{if } (\overline{p_{parent} p_1} \times \overline{p_1 p_2}) \cdot \vec{e} = 0 \\ -1 & \text{if } (\overline{p_{parent} p_1} \times \overline{p_1 p_2}) \cdot \vec{e} < 0 \end{cases} \quad (3)$$

where $\vec{e}$ is a unit vector perpendicular to both $\overline{p_{parent} p_1}$ and $\overline{p_1 p_2}$ which completes a right-handed system. Here, $(\overline{p_{parent} p_1} \times \overline{p_1 p_2}) \cdot \vec{e} = 0$ means $\overline{p_{parent} p_1}$ and $\overline{p_1 p_2}$ are collinear, and the curvature is $\kappa(x_1)=0$.

The value of the reference curvature for $x_1$, $\kappa_{ref}(x_1, \sigma_{ref})$, is calculated by projecting $x_1$ to a point on the reference path $\sigma_{ref}$ and computing the curvature of such point. For instance, the nearest point projection can be used, $$\kappa_{ref}(x_1, \sigma_{ref}) = \kappa(\text{argmin}_{x_{ref} \in \sigma_{ref}} \|p_{ref} - p_1\|) \quad (4)$$

where $x_{ref}=(p_{ref}, \psi_{ref})$ is any point on $\sigma_{ref}$.

One advantage of this projection is that the reference curvature of each node inside the tree needs to be calculated only once. Afterwards, the calculated curvature is stored in memory and reused for subsequent computations to increase computational efficiency of a large number of iterations. Cost function of Equation (1) can be used throughout the path planning algorithm also to compute the nearest neighbor, which is selected by calculating the cost from each node to the random node using cost function (1), and by setting the node which has the lowest cost as the nearest neighbor to the random node. This results in different path being generated according to the weights of the terms of the cost function (1). For example, if weight on the curvature difference between the planned path and the reference path is higher, then the path 256 is the resulted modified path, while if the weight on the Euclidean distance is higher, the path 257 is selected.

Generation of Refined Path

Figure 5:
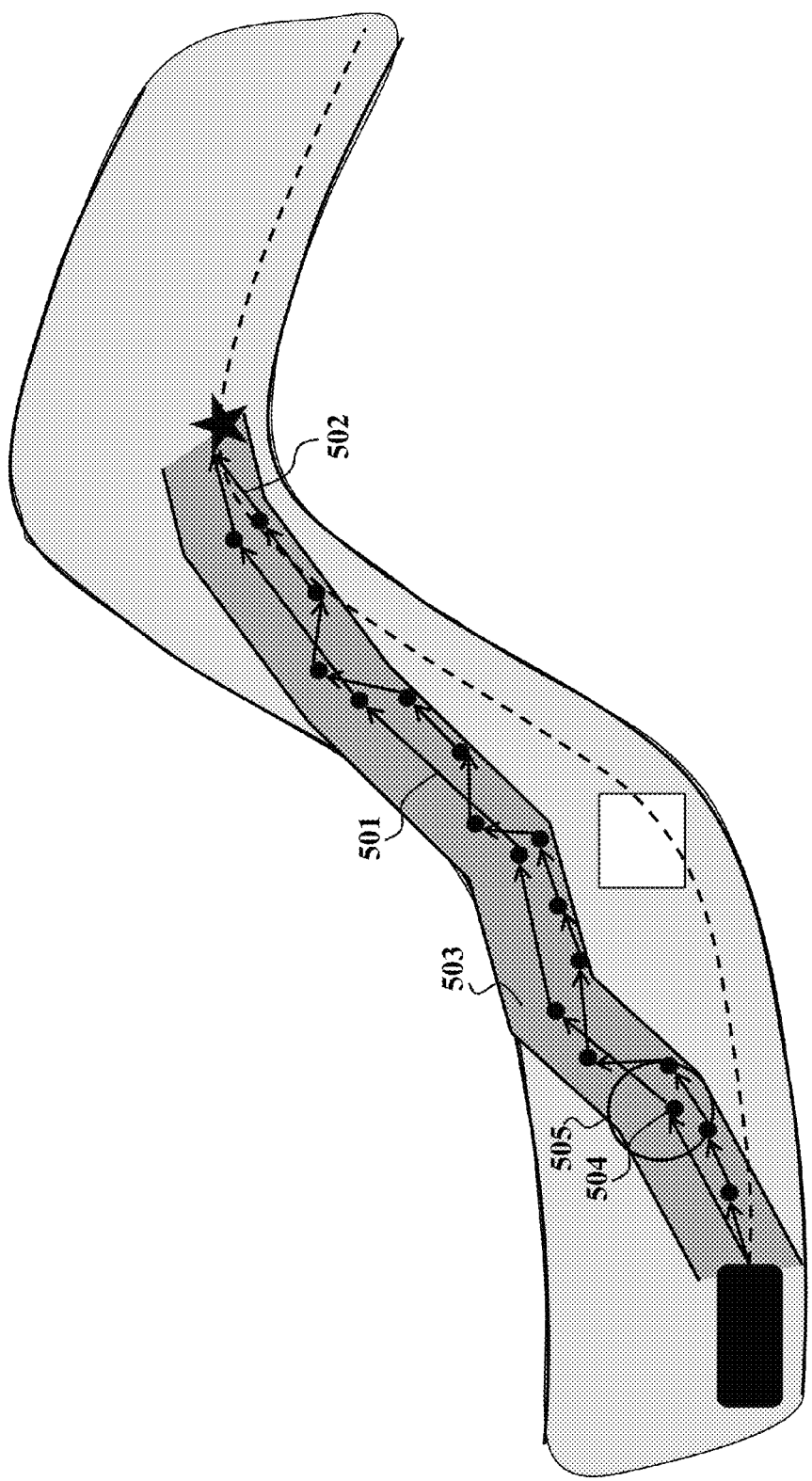
FIG. 5 is a schematic illustrating obtaining a fine path around a given coarse path according to one embodiment of the invention.

FIG. 5 shows a schematic illustrating refining 402 a coarse path 501 determined at the step 401 according to one embodiment. Given the coarse path 501, an area 503 around it is considered, and a refined path 502 in such an area is obtained with higher density of nodes. For example, one embodiment randomly places new points 504 in an area 505 centered on the coarse path 501.

During the refining stage, the neighborhood of the refined the path is sampled. As shown in FIG. 5, given a coarse path 501 with points $\{x_{init}, x_1, x_2, \ldots, x_n, x_{goal}\}$, some embodiments first select a point 504 from these points $x_i$ randomly, and then the embodiments sample uniformly in the cylinder 505 centered at the selected point, $C_{x_i,r'} := \{x = (p,\psi) \in X \| p - p_i \| \leq r', |\psi - \psi_i| \leq \delta\}$. Here, the dimensions of the cylinders are determined by selecting as $r' = \eta$, where $\eta$ is the extension segment length of path planning system, and $\delta$ is usually chosen in $(0, \frac{\pi}{2}]$.

During the refining stage the sampling is more dense in the area around the coarse path, which is obtained by enforcing any new point 423 to be at less distance from the closest node 426, than what previously allowed during the coarse path generation.

In some embodiments, more points are placed in the first stage than in the second stage. The reason is that it is important to explore the entire environment to find a good enough coarse path before entering into the second stage to do refinement where the search area is smaller and hence fewer samples are needed.

Removal of Nodes/Points

Because some embodiments place the new nodes randomly, there can be some unnecessary points in the path which introduce unnecessary turns and can make the vehicle movement less comfortable for the driver. Those points are removed by some embodiments of the invention.

Figure 6:
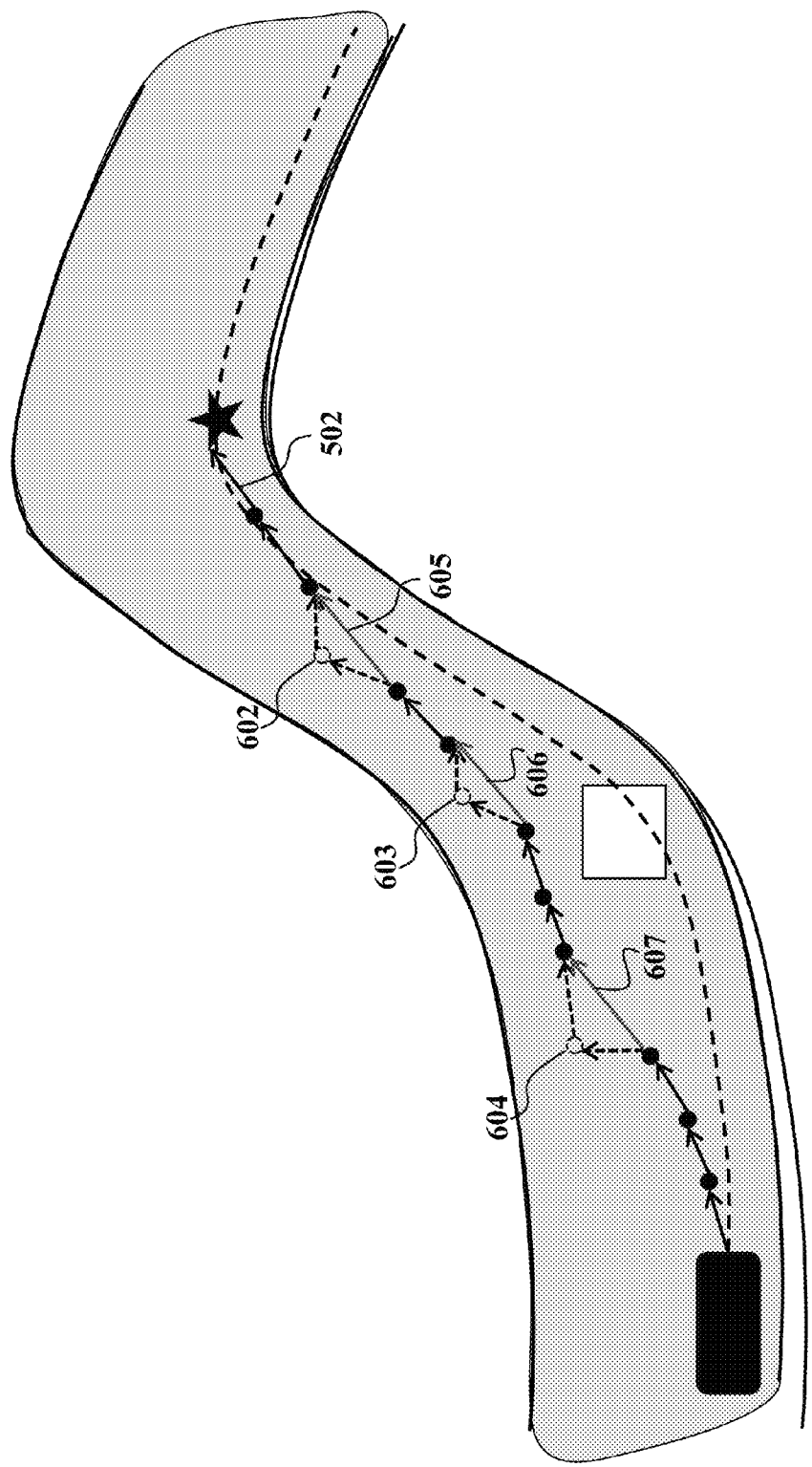
FIG. 6 is a schematic illustrating removing redundant nodes from the refined path according to one embodiment of the invention.

FIG. 6 shows a schematic illustrating removing 403 redundant nodes from the refined path 502 according to one embodiment. Nodes 602, 603, 604 that cause unnecessary turns are removed, the corresponding disconnected links are removed, and the links 605, 606, 607 between the previous and next node of the removed nodes are added.

Let the points of the refined path be $\sigma = \{x_0, x_1, x_2, \ldots, x_n, x_{n+1}\}$, where $x_i = (p_i, \psi_i)$, $x_0 = x_{init}$ and $x_{n+1} = x_{goal}$. Let the pruned path be $\sigma_p$, set $\sigma_p = \emptyset$, and let $j = n+1$. The pruning works as follows. Add $x_j$ to $\sigma_p$. Starting from $x_0$, find all points in $\{x_0, x_1, \ldots, x_{j-1}\}$ such that $\sigma^*_{x_i,x_j}(i \in [0, j-1])$ is collision free, denote these waypoints by $X_{candidate}$. For all the $x_k \in X_{candidate}$, find the one which minimizes $(\theta_k + \theta_j)$, where $$\theta_k = \frac{u_k \cdot \overrightarrow{p_k p_j}}{\|\overrightarrow{p_k p_j}\|}, u_k = [\cos(\psi_k), \sin(\psi_k)]^T, \text{ and}$$

$$\theta_j = \frac{u_j \cdot \overrightarrow{p_k p_j}}{\|\overrightarrow{p_k p_j}\|}, u_j = [\cos(\psi_j), \sin(\psi_j)]^T.$$

Then, let $j = k$ and repeat this process until $k = 0$.

Smoothing

Even after unnecessary points are removed, the path is still can include segments joined by corners. Thus, the path is not smooth, which can create at least two problems. First, many vehicles, such as cars, can only follow smooth paths and thus will not be able to follow the path properly. Also, the control system that receives the path and actuates the vehicle commands normally requires a smooth path to operate.

FIG. 7 shows a schematic illustrating the smoothing 404 of the path 701 after node removal 403 according to one embodiment. Such a smoothing results in a path that still passes through the nodes, but includes smooth curves rather than a sequence of links with sharp edges.

In some embodiments, the path 701 is smoothed by fitting a smooth curve 702 among the points. For instance, $G^2$ Continuous Cubic Bézier Spiral (G2CBS) can be used to generate a continuous curvature path between two consecutive line segments. A Bézier curve is defined as:

$$P(s) = \sum_{i=0}^{n} \binom{n}{i} (1-s)^{n-i} s^i P_i \qquad (5)$$

where n is the degree of the Bézier curve, $s \in [0,1]$, $P_i$ are the control points. The eight control points for the curve described by Equation (5) are given by $B_0 = p_1 + L u_1, B_1 = B_0 - g_b u_1,$ $B_2 = B_1 - h_b u_1, B_3 = B_2 + k_b u_d,$ $E_0 = p_1 + L u_2, E_1 = E_0 - g_e u_2,$ $E_2 = E_1 - h_e u_2, E_3 = E_2 - k_e u_d$ where $u_1$ is the unit vector along the line $\overrightarrow{x_1 x_{parent}}$, $u_2$ is the unit vector along the line $\overrightarrow{x_1 x_2}$, $u_d$ is the unit vector along the line $\overrightarrow{B_2 E_2}$, and $$h_b = h_e = q_3 L,$$

$$g_b = g_e = q_2 q_3 L,$$

$$k_b = k_e = \frac{6 q_3 \cos \beta}{q_2 + 4} L$$

where $$\beta = \frac{\gamma}{2}$$

and $\gamma$ is the angle between vector $\overrightarrow{x_{parent} x_1}$ and $\overrightarrow{x_1 x_2}$. The parameters $q_1, q_2, q_3, q_4$ are $$q_1 = 7.2364, q_2 = \frac{2}{5}(\sqrt{6} - 1), q_3 = \frac{q_2 + 4}{q_1 + 6}, q_4 = \frac{(q_2 + 4)^2}{54 q_3} \qquad (6)$$

The parameter L is the distance between $p_1(x_1 = (p_1, \psi_1))$ and $B_0$, and also is equal to the distance between $p_1$ and $E_0$. Based on this, L can be chosen as $$L = \min\left\{\frac{\min\{\|\overrightarrow{p_{parent} p_1}\|, \|\overrightarrow{p_1 p_2}\|\}}{2}, \frac{\eta}{2}\right\} \qquad (7)$$

The reason for selecting L as described in Equation (7) is that one edge is used twice for smoothing, so 2L is less than or equal to $\min\{\min\{\|\overrightarrow{p_{parent} p_1}\|, \|\overrightarrow{p_1 p_2}\|\}, \eta\}$. Using this smoothing technique, a $G^2$ continuous path between initial and final points is obtained. If the path is required to be continuous also at the initial and final points, two additional waypoints in the yaw direction $\psi_{init}$ and $\psi_{goal}$, can be added, and then the path planning system can be used to find additional waypoints between these two new waypoints. The smoothing can be applied to all points, including the additional points, and provides a $G^2$ continuous path, which is also smooth at initial and final point.

Updating Path

Some embodiments of the invention are based on recognition that the current path and/or the modified path can be updated according to the changes on the road. For example, the modified path can be further updated in response to a change of the current position of the vehicle and/or in response to detecting a new obstacle or detecting a change in the behavior of the previously detected obstacle. In such situation, some embodiments update the modified path to reuse at least some portions of the modified path for performance efficiency.

Figure 8A:
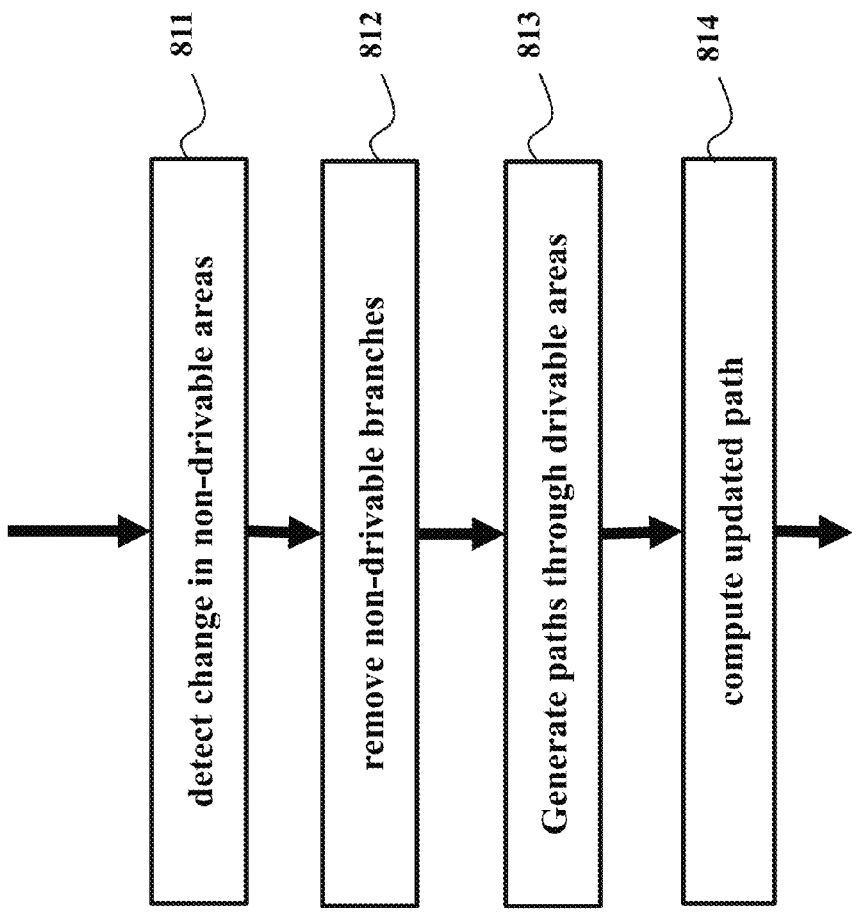
FIG. 8A is a flow chart of a method for updating the modified path according to some embodiments of the invention.

FIG. 8A shows a flow chart of a method for updating the modified path according to some embodiments of the invention. The method detects 811 changes in the non-drivable areas, removes 812 the paths through new non-drivable areas are removed 312, and generates 813 new paths crossing new drivable areas. Next, the method updates the current and the target positions of the vehicle and connects the existing paths with the current and the target positions to update 814 the modified path.

Figure 8B:
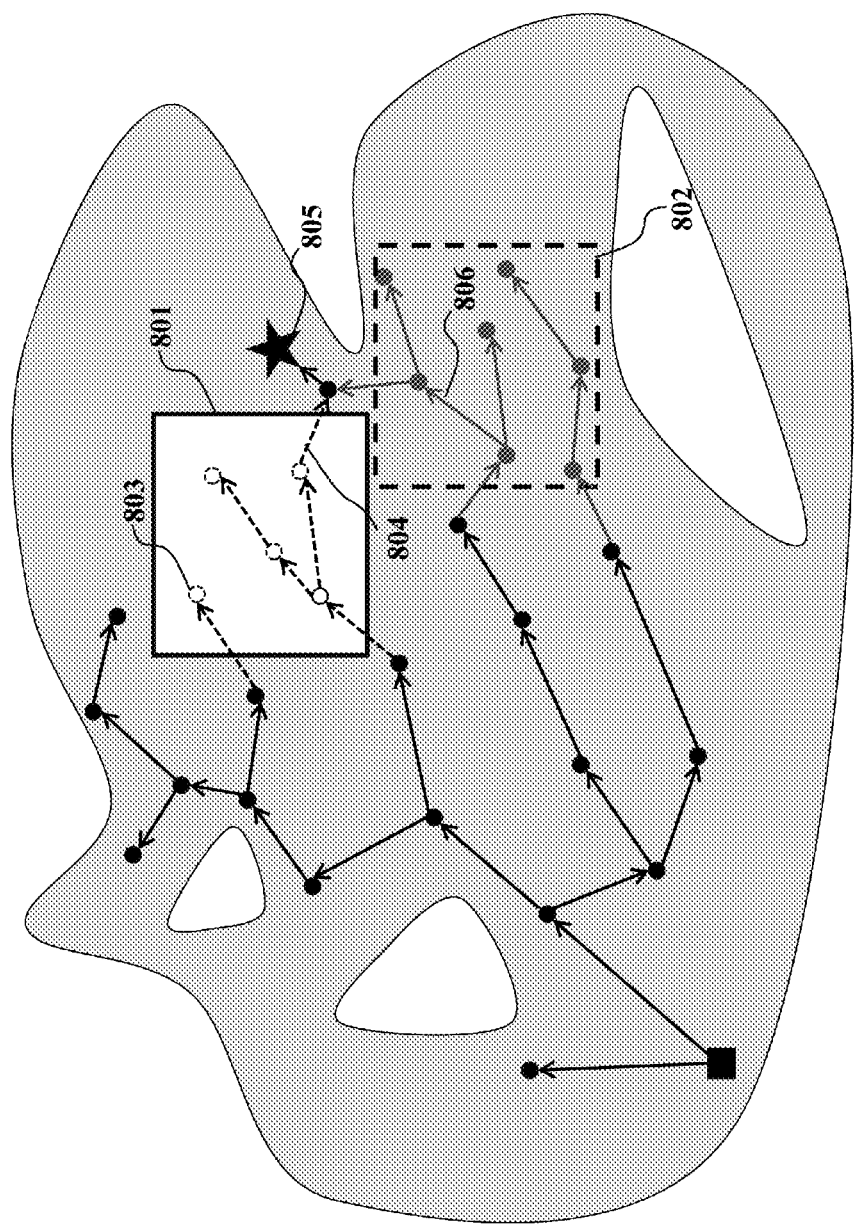
FIG. 8B is a schematic illustrating the update of the modified path according to one embodiment of the invention.

FIG. 8B shows a schematic illustrating the update of the modified path according to one embodiment of the invention after a non-drivable area, such as an obstruction 801, moved from a previous position 802. Due to the movement, certain links and nodes such as 803 are no longer valid and are removed from the tree. This causes a break in the path to the target position 805 because the link 804 is removed. However, the area 802 that was before occupied by the obstruction is now drivable. So additional nodes are added in the area and a new links, e.g., a link 806, forming the updated path to the target position are determined.

When a previously planned path is available, the path planning system can use that path to reduce the number of computations. However, the path may need to be adjusted for accounting for changes in the non-drivable area, due for instance to one or more obstacles that moved, and for the changed vehicle position.

In some embodiments, when a new obstacle appears or an obstacle changes position, first the edges which collide with the new obstacles are determined. For each edge that intersects with obstacles, the corresponding child endpoint node is marked as invalid. Next, the original path from $x_{init}$ to $x_{goal}$ is checked for invalid nodes. If the path does not include such nodes, the path is not changed. Otherwise, the tree is trimmed and regrown.

Trimming can be performed by traversing through each node of the tree and marking all the child of the invalid nodes as invalid. Then, all the invalid nodes and the edges connecting to them are removed from the tree. After the tree is trimmed, the tree is regrown to find a new path. Some embodiments generate samples in the neighborhood of the areas surrounding the parts of the drivable areas that have changed, from drivable to undrivable and from undrivable to drivable. In this way, new branches of the tree covering the modified areas can be determined more quickly.

In addition, some embodiments determine the path backwards, i.e., from the target position to the current position. However, when the current position of the vehicle is changed, the embodiment updates the selected path, while preserving a portion of the modified path approaching the target position. In such a manner, a portion of the selected path can be reused, which further reduce the computational complexity.

If the tree root is selected as the vehicle current position, as soon as the vehicle moves the tree needs to be recomputed, because the root has changed. Instead, some embodiments set the root at the target position and set the target at the current vehicle position. In this way the tree is connecting the goal position to any current vehicle position in the drivable area, which means that when the vehicle position changes, a new path is already available. As for the stopping criterion, the embodiments return a path between $x_{init}$ and $x_{goal}$ when a random node is placed inside the cylinder centered at $x_{init}(p_{init},\psi_{init})$ and the path connecting the random node to $x_{init}$ is collision free. The area 504 can be defined as $C_{x_{init},\eta,\Psi}:=\{x=(p,\psi)\in X|\|p-p_{init}\|\leq\eta, |\psi-\psi_{init}|\leq\Psi\}$, where $\Psi$ is the maximum yaw difference between $\psi_{init}$ and configuration of its parent.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a semi-autonomous vehicle, comprising:

determining a current path for the vehicle in response to actions received from a driver of the vehicle, wherein the actions of the driver include an operation of a steering wheel of the vehicle, pedals of the vehicle, or both, wherein the current path starts at a current position and orientation of the vehicle and ends in a target position and orientation of the vehicle and includes a sequence of points, wherein each point represents coordinates of position of the vehicle and an orientation of the vehicle;

modifying the current path for the vehicle while preserving the current position and the target position of the vehicle in a modified path; and overriding the actions of the driver to control a movement of the vehicle according to the modified path, wherein steps of the vehicle are performed using a processor of the vehicle, wherein the modifying and the overriding steps are performed in response to detecting an obstacle on the current path of the vehicle, and wherein the modifying comprises:

determining a coarse path defined by a first set of nodes with coarse separation connecting a node representing the current position and orientation with a node representing the target position and orientation, wherein each node represents values of the position and the orientation of the vehicle;

refining the coarse path to produce a refined path formed by a second set of nodes with fine separation, such that the refined path is close to the determined coarse path;

removing at least one redundant node of the refined path that increase the value of a cost function without being useful for avoiding obstacles to produce a pruned path, wherein the cost function balances a combination of a deviation of the modified path from the current path and a difference between a curvature of the modified path and a curvature of the current path; and smoothing a trajectory connecting the nodes of the pruned path to produce the modified path.

2. The method of claim 1, wherein the modifying comprises:

determining a set of paths from the current position to the target position of the vehicle, wherein each path avoids the obstacle while satisfying driving constraints;

determining, for each path in the set of paths, a metric of performance as a function of a difference between the current path and each path in the set of paths; and selecting a path from the set of paths as the modified path according to the metric of performance of the path.

3. The method of claim 2, wherein the metric of performance is a total position difference between the current path and each path in the set of paths, such that the path selected as the modified path has the metric of performance corresponding to a minimal total position difference.

4. The method of claim 2, wherein the metric of performance of the path is a cost function balancing a combination of a deviation of the path from the current path and a difference between a curvature of the path and the curvature of the current path, such that the path selected as the modified path has the metric of performance corresponding to a minimal value of the cost function.

5. The method of claim 1, wherein the modifying comprises:

determining the modified path by optimizing the cost function reducing the deviation of the modified path avoiding the obstacle from the current path.

6. The method of claim 1, wherein the modifying comprises:

determining the modified path avoiding the obstacle by optimizing the cost function balancing the combination of the deviation of the modified path from the current path and the difference between the curvature of the modified path and the curvature of the current path.

7. The method of claim 1, wherein the determining of the coarse path comprises:

generating a tree of nodes such that links connecting the nodes form a set of coarse paths connecting the current position with the target position;

placing a new node in the tree if a coarse path passing through the new node is more optimal according to the cost function than another coarse path not passing through the new node.

8. The method of claim 7 wherein the generating the tree of nodes comprises:

sampling a random node in a drivable space of the vehicle;

determining the new node on a path connecting the random node and the nearest node from the tree of nodes;

detecting a collision with obstacles along the path between the new node and the nearest node; and when the collision is not detected adding the new node to an existing node in the tree of nodes that reduces a cost of reaching the new node from a root of the tree of nodes, wherein the cost includes a sum of a cost to reach the existing tree node from the root node and a cost of reaching the new node from the existing tree node determined according to the cost function.

9. The method in claim 8, further comprising in response to adding the new node to the tree of nodes:

replacing an old link of reaching a neighboring node with a new link of reaching the neighboring node from the new node, when the cost of reaching the neighboring node through new link is less that a cost of reaching the neighboring node through the old link.

10. The method of claim 1, wherein the refining comprises:

placing new nodes with higher density than those in the coarse path in an area centered around the coarse path.

11. The method of claim 1, further comprising:

determining the set of points of the coarse path backwards from the target position to the current position; and updating the set of nodes of the coarse path corresponding to the modified path forwards from the current position to the target position in response to a change of the current position of the vehicle while preserving a portion of the modified path approaching the target position.

12. A method for controlling a semi-autonomous vehicle, comprising:

determining a current path for the vehicle in response to actions received from a driver of the vehicle, wherein the actions of the driver include an operation of a steering wheel of the vehicle, pedals of the vehicle, or both, wherein the current path starts at a current position and orientation of the vehicle and ends in a target position and orientation of the vehicle and includes a sequence of points, wherein each point represents coordinates of position of the vehicle and an orientation of the vehicle;

modifying the current path for the vehicle, in response to detecting an obstacle on the current path of the vehicle, to produce a modified path avoiding the obstacle, wherein the modifying includes optimizing a cost function of a deviation of the modified path from the current path; and overriding the actions of the driver to control a movement of the vehicle according to the modified path, wherein steps of the vehicle are performed using a processor of the vehicle, wherein the modifying and the overriding steps are performed in response to detecting an obstacle on the current path of the vehicle, and wherein the modifying comprises:

determining a coarse path defined by a first set of nodes with coarse separation connecting a node representing the current position and orientation with a node representing the target position and orientation, wherein each node represents values of the position and the orientation of the vehicle;

refining the coarse path to produce a refined path formed by a second set of nodes with fine separation, such that the refined path is close to the determined coarse path;

removing at least one redundant node of the refined path that increase the value of a cost function without being useful for avoiding obstacles to produce a pruned path, wherein the cost function balances a combination of a deviation of the modified path from the current path and a difference between a curvature of the modified path and a curvature of the current path; and smoothing a trajectory connecting the nodes of the pruned path to produce the modified path.

13. The method of claim 12, wherein the cost function is optimized subject to constraints on the movement of the vehicle.

14. The method of claim 13, wherein the constraints includes a constraint enforcing the modified path to start at the current position of the vehicle and to end at the target position of the vehicle.

15. A semi-autonomous vehicle, comprising:

a navigation system for determining a current path for the vehicle in response to actions received from a driver of the vehicle, wherein the actions of the driver include an operation of a steering wheel of the vehicle, pedals of the vehicle, or both, wherein the current path starts at a current position and orientation of the vehicle and ends in a target position and orientation of the vehicle and includes a sequence of points, wherein each point represents coordinates of position of the vehicle and an orientation of the vehicle;

a sensor for detecting an obstacle on the current path of the vehicle;

a path planning system for modifying the current path for the vehicle, in response to detecting an obstacle on the current path of the vehicle, to produce a modified path avoiding the obstacle, wherein the modifying includes optimizing a cost function of a deviation of the modified path from the current path, wherein the cost function is optimized subject to constraints on the movement of the vehicle, and wherein the constraints includes a constraint enforcing the modified path to start at the current position of the vehicle and to end at the target position of the vehicle, wherein the modifying is performed in response to detecting an obstacle on the current path of the vehicle, and wherein the modifying comprises:

determining a coarse path defined by a first set of nodes with coarse separation connecting a node representing the current position and orientation with a node representing the target position and orientation, wherein each node represents values of the position and the orientation of the vehicle;

refining the coarse path to produce a refined path formed by a second set of nodes with fine separation, such that the refined path is close to the determined coarse path;

removing at least one redundant node of the refined path that increase the value of a cost function without being useful for avoiding obstacles to produce a pruned path, wherein the cost function balances a combination of a deviation of the modified path from the current path and a difference between a curvature of the modified path and a curvature of the current path; and smoothing a trajectory connecting the nodes of the pruned path to produce the modified path; and a set of actuators for overriding the actions of the driver to control a movement of the vehicle according to the modified path.

* * * * *